(12) United States Patent
Garnier et al.

(10) Patent No.: US 6,821,629 B2
(45) Date of Patent: Nov. 23, 2004

(54) SOUNDPROOFING LAMINATED WINDOW FOR VEHICLES

(75) Inventors: Gilles Garnier, Thourotte (FR); Marc Rehfeld, Ezanville (FR); Franz Kraemling, Aachen (DE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/028,215

(22) Filed: Dec. 28, 2001

(65) Prior Publication Data

US 2002/0068177 A1 Jun. 6, 2002

Related U.S. Application Data

(63) Continuation of application No. 09/488,674, filed on Jan. 21, 2000, now abandoned, which is a continuation of application No. 08/978,024, filed on Nov. 25, 1997, now Pat. No. 6,074,732.

(30) Foreign Application Priority Data

Nov. 26, 1996 (FR) .............................................. 96 14404
Feb. 14, 1997 (DE) ......................................... 197 05 586

(51) Int. Cl.$^7$ ............................ B32B 5/00; B32B 7/02; B44F 1/10
(52) U.S. Cl. ....................... 428/426; 428/215; 428/216; 428/29; 428/98; 428/212
(58) Field of Search ........................... 428/212, 29, 98, 428/215, 216; 156/101, 252, 253, 99

(56) References Cited

U.S. PATENT DOCUMENTS

| | | | |
|---|---|---|---|
| 3,816,201 A | | 6/1974 | Armstrong et al. |
| 4,427,743 A | | 1/1984 | Katsuki et al. |
| 5,066,525 A | * | 11/1991 | Nakamachi et al. .......... 428/29 |
| 5,154,953 A | | 10/1992 | de Moncuit et al. |
| 5,380,575 A | * | 1/1995 | Kuster et al. ................. 428/98 |
| 5,443,869 A | * | 8/1995 | Harris ......................... 428/13 |
| 5,496,643 A | * | 3/1996 | Von Alpen .................. 428/432 |
| 5,506,037 A | * | 4/1996 | Termath ..................... 428/216 |
| 6,074,732 A | * | 6/2000 | Garnier et al. .............. 428/215 |

FOREIGN PATENT DOCUMENTS

| | | |
|---|---|---|
| DE | 1 115 452 | 10/1957 |
| DE | 690 02 842 | 4/1994 |
| DE | 689 19 452 | 5/1995 |
| DE | 197 05 586 | 4/1998 |
| EP | 0 100 147 | 2/1984 |
| EP | 0 387 148 | 9/1990 |
| EP | 0 457 190 | 11/1991 |
| EP | 0 532 478 | 3/1993 |
| EP | 0 763 420 | 3/1997 |
| EP | 0 844 075 | 5/1998 |
| EP | 0 852 999 | 7/1998 |
| FR | 2 756 225 | 5/1998 |
| WO | WO 98/16927 | 6/1998 |

OTHER PUBLICATIONS

Letter dated Jun. 22, 1995 from Gerhard Hoyer to Boris Gregl.
Certified copy of Application Ser. No. 08/766,999, filed Dec. 16, 1996; including 23pp. of Specification; 3 Sheets of Drawings and Declaration, Power of Attorney and Petition.
Certified copy of Application Ser. No. 08/783,596, filed Jan. 13, 1997; including 30pp. of Specification; 1 Sheet of Drawing and Declaration Power of Attorney and Petition.
Nomogram for ISD 112; "Nomogram for 3M Scotchdamp ISD–112™"; 1p., no date.
3M; 1991; "Improve Product Performance With Scotchdamp Brand Vibration Control Systems"; pp. 1–8.
3M Product Information and Performance Data "Scotchdamp TM Vibration Control Systems"; 1996; pp. 1–12.
Troplast AG ; "Wir Sandten Ihnen Fuer Ihre Rechnung Und Auf Ihre Gefahr Zu Den Umseitig Abgedruckten Allgemeinen Verkaufsbedingungen"; Sep. 23, 1996; pp. 1–5.
Trosifol MV—MasterCurve; Figure 1 and 2, no date.

\* cited by examiner

Primary Examiner—Cynthia H. Kelly
Assistant Examiner—L. Ferguson
(74) Attorney, Agent, or Firm—Oblon, Spivak, McClelland, Maier & Neustadt, P.C.

(57) ABSTRACT

The invention relates to a soundproofing window in which an intermediate film provides for damping of vibrations transmitted in particular by structure-borne conduction.

15 Claims, 2 Drawing Sheets

SOUNDPROOFING LAMINATED WINDOW FOR VEHICLES

BACKGROUND OF THE INVENTION

1. Field of the Invention

The present invention relates to a window for vehicles, particularly automobile vehicles, having improved acoustic insulation properties, especially with respect to noise of structure-borne origin.

2. Discussion of the Background

Soundproofing windows are used not only for windows in buildings but also to an increasing extent in automobiles. Although soundproofing windows for buildings can be relatively thick, laminated windows used for automobile construction usually have thicknesses not exceeding about 6 mm. Consequently it is advisable to use, as an intermediate layer between the two sheets of window glass, a viscoelastic polymer that imparts a highly effective anti-noise effect even in relatively thin layers. In addition, the polymer must also satisfy, over the long term (meaning for the entire life of the vehicle) all conditions imposed on polymers used in automobile windows. These conditions include in particular low cloudiness, high transparency and good ultraviolet resistance. In addition, these polymers must ensure high-quality and durable assembly with the adjacent layers and must retain their good noise-damping properties even at high and low temperatures. Finally, the anti-noise layers must not impair the safety-glass properties of the window. Acrylic viscoelastic polymers have proved particularly appropriate as antinoise layers.

EP 0 532 478 A2 teaches a soundproofing laminated window that is also suitable as an automobile window and that comprises an intermediate layer of viscoelastic acrylic polymer. In the case of this known laminated window, the intermediate layer separating the two glass sheets is formed by a polymerizable monomeric composition comprising 5 to 50 weight % of an aliphatic polyurethane and 15 to 85 weight % of a photopolymerizable mixture of different acrylic monomers and common polymerization additives. The mixture of monomers is admitted into the space separating the two glass sheets, and polymerization by ultraviolet radiation is initiated. This known soundproofing laminated window is not suitable for series production, however, because its process of production (polymerization of the mixture of monomers introduced between the glass sheets) is relatively expensive.

In the case of the industrial process for production of laminated windows, assembly of the two glass sheets with a prefabricated polymer film is generally performed at elevated temperature and under pressure. A process of this type intended for production of laminated windows having good noise-damping properties is known from EP 0 457 190 A1. In the case of this known process, a prefabricated polymer film having a high noise-damping coefficient and comprising at least two layers, one of which is made from a first specified polyvinyl acetal and plasticizer and the other of a second specified polyvinyl acetal and plasticizer.

Viscoelastic acrylic polymers with good noise-damping properties are also known in the form of thin films. These anti-noise films can be used for production of laminated windows by interposing them between two thermoplastic films comprising in particular polyvinylbutyral and bonding them to these films as well as to two external glass sheets by the standard process for production of laminated windows by assembly at elevated temperature and under pressure.

Soundproofing windows of this type have a good noise-damping coefficient, but it has been found that in the course of time the acrylic polymer becomes cloudy and the noise-damping properties deteriorate, with the result that the laminated window thereby becomes useless.

On the other hand, among all the qualities contributing to comfort in modern transportation means such as trains and automobiles, silence is becoming the determining factor. In fact, the other sources of discomfort stemming from mechanical, thermal, visibility, and other considerations have been gradually mastered. Improvement of acoustic comfort presents new difficulties, however; noises of aerodynamic origin, in other words noises created by friction between the air and the moving vehicle, have been treated successfully, at least in part, at their source, or in other words, to economize on energy, the shapes have been modified, penetration into the air has been improved, and turbulence effects, which themselves are noise sources, have been reduced. Among the vehicle walls that separate the source of external aerodynamic noise from the inside compartment in which the passenger is situated, windows are obviously the most difficult to treat. Pasty or fibrous absorbing materials intended for opaque walls cannot be used and, for practical or weight reasons, the thicknesses cannot be increased. European Patent EP B1 0 387 148 teaches windows that achieve good insulation from noise of aerodynamic origin without excessive increase in their weight and/or thicknesses. The patent thus teaches a laminated window in which the intermediate layer has a flexural damping coefficient of $v=\Delta f/f_c$ larger than 0.15, the measurement being performed by shock excitation of a laminated bar of 9 cm length and 3 cm width made of a laminated glass in which the resin is located between two glass members each 4 mm thick, and by measuring $f_c$, the resonance frequency of the first mode, and $\Delta f$, the peak width at amplitude $A/\sqrt{2}$, where A is the maximum amplitude at frequency $f_c$, such that its acoustic attenuation index does not differ for any of the frequencies higher than 800 Hz by more than 5 dB from a reference index, which increases by 9 dB per octave up to 2000 Hz and by 3 dB per octave at higher frequencies. In addition, the standard deviation $\sigma$ of the differences of its acoustic attenuation index relative to the reference index is always smaller than 4 dB. The thicknesses of the two glass members can be identical and equal to 2.2 mm. This patent therefore proposes a general solution to the problem of acoustic insulation of the aerodynamic noises of a vehicle.

However, the noises themselves such as engine noises, bearing noises or suspension noises must be treated at the same time. These noises have already been treated at their origin or to some extent during their propagation, whether airborne (especially absorbing lining) or structure-borne (joints of elastomer, for example). For windows, European Patent EP B1 0 100 701 teaches windows that achieve good soundproofing of highway noises, or in other words good insulation of noises during their airborne propagation.

One of the windows according to this patent comprises at least one laminated window, and the resin of the laminated window is such that a bar of 9 cm length and 3 cm width made of a laminated glass comprising two glass sheets of 4 mm thickness joined together by a 2 mm layer of this resin has a critical frequency that differs by at most 35% from that of a glass bar having the same length, the same width and a thickness of 4 mm. The windows according to this patent have an excellent acoustic attenuation index for highway traffic.

In contrast, the treatment of windows to combat noises of structure-borne origin, meaning noises transmitted through solids, is more difficult to achieve. In fact, it turns out that the use of joints is still insufficient to prevent transmission of noise by window vibration. In this connection, it has actually been observed that, at certain engine speeds, perceptible buzzing is felt by the passenger, thus causing a source of discomfort. In fact, the engine rotation leads to the development of vibrations which are transmitted, for example, to the car body and then by chain effect to the windows. It is known that the energy acquired by an object subjected to a shock causes a vibration phenomenon, and that, immediately after the shock, once the object has become free again, it vibrates in its natural mode. A vibrational frequency is associated with each mode. The vibrational amplitude depends on the initial excitation, or in other words on the spectral component of the shock (amplitude of the shock at the frequency under study) and of the impact zone of the shock, the magnitude of the modal deformation depending on whether the shock occurred at a neutral point or vibration node.

The following conditions must be met for a natural mode to be excited:

(1) the deformation caused at the point of impact is not situated at a vibration node of the mode,
(2) the energy spectrum of the shock has a component at the resonance frequency of the mode.

This second condition is almost always met, because a very brief shock has a practically uniform energy spectrum.

The first condition is also met and, for a bar free at its ends, for example, it is sufficient to tap one of the ends to excite all modes.

In the application in question, structure-borne excitation is peripheral and the inventors have demonstrated that, at certain engine vibration frequencies, in other words at certain engine speeds, the windows and the passenger compartment of the vehicle each have a vibration mode, the coupling of which amplifies the window buzzing caused by radiation of noises originating in this case from the engine. Of course, the engine speed causing these phenomena is particular to each type of vehicle, and therefore cannot be generalized to a single value.

SUMMARY OF THE INVENTION

The inventors have established that, by using a resin meeting the conditions stated in the introduction, which is different from those proposed in the patents cited hereinabove, to join the sheets of glass in laminated structure, such a structure provides particularly satisfying properties, far superior to those achieved heretofore, for damping audible sounds of structure-borne origin.

OBJECTS OF THE INVENTION

One object of the invention is a vehicle window having acoustic insulation properties and, in particular, properties making it possible to decrease noises radiated by the window under structure-borne excitation.

The invention also has the object of providing a soundproofing laminated window which on the one hand provides great ease of use and good noise-damping properties, and on the other hand retains its good optical properties and absence of cloudiness even over the long term.

Another object of the invention is to provide such a window that achieves good protection from noises of structure-borne origin while conferring on the windows improved acoustic performances with respect to noises or aerodynamic origin and also external noises.

BRIEF DESCRIPTION OF THE DRAWINGS

Other advantages and characteristics of the invention will become apparent in the following description, provided with reference to the attached drawings, wherein.

DETAILED DESCRIPTION OF THE INVENTION

Figure 1:
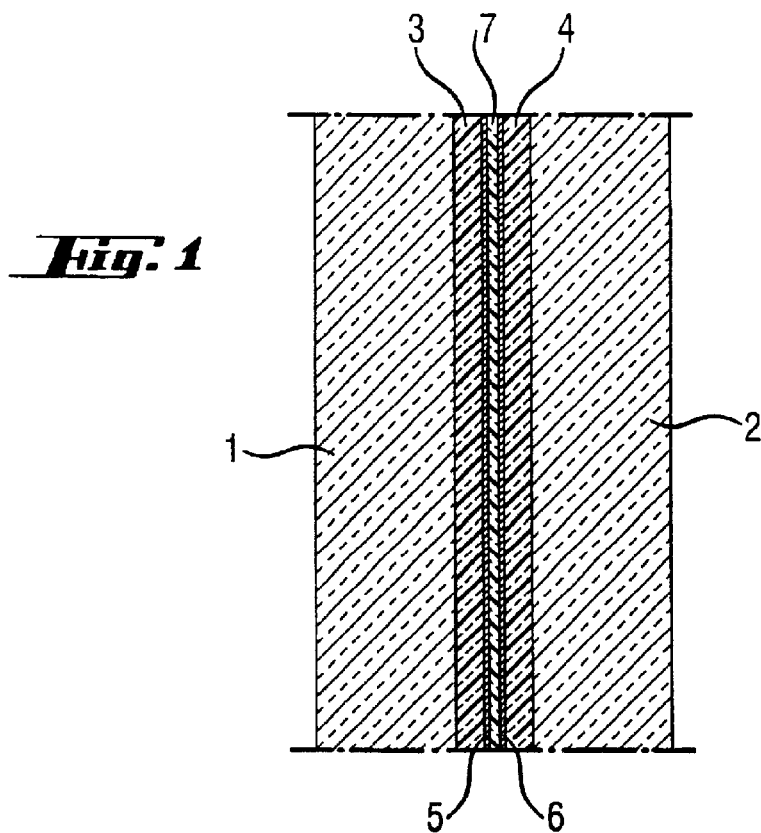
FIG. 1 shows a first embodiment of the laminated window according to the invention.

The window according to the invention is preferably designed to ensure soundproofing of a vehicle and in particular soundproofing against noises of structure-borne origin, and is made of a laminated window comprising at least one glass sheet and one intermediate film having a loss factor tan δ greater than 0.6 and a shear modulus G' smaller than $2 \times 10^7$ N/cm$^2$ in a temperature range between 10 and 60° C., in a frequency range between 50 and 10,000 Hz. These measurements of the dynamic characterization of the material are performed on a viscoanalyzer, for example a Metravib viscoanalyzer, under measurement conditions to be defined hereinafter.

The technique of the invention makes it possible to obtain a soundproofing window made of a laminated window in which the intermediate film brings about damping of the vibrations originating from the engine and transmitted in particular by the car body, to the effect that the radiation of vibrational modes of the window are attenuated so much that coupling with the vibrational modes of the passenger compartment no longer takes place, regardless of engine speed.

According to one embodiment of the invention, the intermediate film imparting damping properties is associated with at least one film of normal acoustic performances. Thus it is permissible to replace part of the thickness of an expensive acoustic film by a "normal" and inexpensive film without deterioration of the acoustic properties but with, for example, an appreciable improvement of the mechanical properties as well as with the entire range of additional properties that can be imparted to such a film: colors, anti-UV, light diffusion, etc.

According to another preferred embodiment of the invention, the intermediate film is a film of thermoplastic acrylic polymer 0.05 to 1.0 mm thick, and this film is joined to a glass sheet with interposition of a polyester film 0.01 to 0.1 mm thick and a layer of thermoplastic cement 0.3 to 0.8 mm thick. In accordance with the invention, a thin film of polyester, especially polyethylene terephthalate, is also interposed between the acrylic polymer film and the layer of thermoplastic cement.

It has been observed that a laminated window of this structure not only can be made without problems by means of standard assembly processes and thus be suitable for series production, but also can permit the exclusion of all the unfavorable influences of the acrylic polymer film by the addition of a thin film of PET between the acrylic polymer film and the layer of thermoplastic cement, which preferably is made of a film of polyvinylbutyral, which is standard for production of laminated windows. In fact, when the acrylic polymer film is in direct contact with the polyvinylbutyral film, particles of the plasticizer of the PVB film apparently diffuse into the acrylic polymer where they cause cloudiness effects as well as deterioration of the noise-damping properties. Surprisingly, the PET films, even if they have only a very thin thickness of less than 50 μm, represent a perfect barrier to diffusion of the plasticizer from the PVB film. In addition, by virtue of their surface properties, the PET films become joined both to the thermoplastic acrylate film and to the standard PVB films, to the effect that the laminated windows according to the invention satisfy all the requirements, even those concerning long-term strength and safety.

In its simplest embodiment, the laminated window according to the invention is made of two glass sheets between which there are interposed the above-mentioned films in the following sequence of layers: PVB-PET-acrylate-PET-PVB. Obviously the standard PVB films can also be replaced by thermoplastic cement films made of other materials, particularly such films made of appropriate thermoplastic polyurethanes.

According to another embodiment, the laminated window according to the invention consists of only one glass sheet which, in mounted condition, faces the outside, while the surface of the laminated window facing the passenger compartment is formed by a polymer layer having adequate abrasion resistance. Such windows of glass and synthetic material offer certain advantages as regards the weight and safety properties, and are known as such in different forms.

Films made of viscoelastic acrylic polymers having a shear modulus G' between $10^{6.5}$ Pa at 0° C. and $10^{4.5}$ Pa at 60° C. as well as a loss factor tan δ between approximately 0.8 and 1 in a temperature range of 0 to 60° C. have proved particularly appropriate for the invention. They include, for example, the products of the 3M Corporation sold under the name "Scotchdamp Polymers", the product brochures and MSD sheets thereof being incorporated herein by reference. These products comprise acrylic polymers that do not contain plasticizers and have damping properties covering a broad temperature range. The product type ISD 112, the damping properties of which are in the temperature range between 0 and 60° C., has proved particularly appropriate. The preparation of intermediate films meeting the characteristics described herein is within the skill of the ordinary artisan.

According to an advantageous embodiment of the invention, one of the layers of the laminated window, particularly a polyethylene terephthalate film, is provided with a layer that reflects infrared radiation.

The present invention also relates to the intermediate film that imparts damping properties with respect to vibrations, transmitted in particular by structure-borne conduction.

According to one embodiment of the invention, the laminated window contains two glass sheets of identical thickness. This common thickness is not limited, and may be equal to 2.2 mm. Thus the technique of the invention makes it possible to obtain a soundproofing window with relatively small total thickness.

According to a particular embodiment of the invention, the intermediate film imparting noise-damping properties is based on plasticizer and polyvinylacetal resins.

According to an advantageous embodiment of the invention, the shear modulus G' of the intermediate film imparting noise-damping properties is between $10^6$ and $2 \times 10^7$ N/m².

The laminated window according to the invention is preferably used for acoustic attenuation of noises of structure-borne origin.

The windows according to the invention have the advantage that good insulation with respect to noises of structure-borne origin is achieved, as is also good insulation with respect to noises of aerodynamic origin and external noises.

The dynamic characterization of the intermediate film is performed on a viscoanalyzer of the Metravib viscoanalyzer type, under certain measurement conditions as listed hereinbelow:

sinusoidal loading,
double-shear test specimen, made of two rectangles of the following dimensions:
thickness=3.31 mm
width=10.38 mm
height=6.44 mm
dynamic amplitude: ±5 mm around rest position,
frequency range: 5 to 700 Hz
temperature range: −20 to +60° C.

By means of the viscoanalyzer, a material specimen can be subjected to deforming loads under precise temperature and frequency conditions, so that the entirety of the Theological variables characterizing the material can be measured and treated.

The raw data of the measurements of force, displacement and phase shift as a function of frequency at each temperature are processed according to techniques known to those of ordinary skill in the art in order to calculate, in particular, the following variables:

elastic component (or shear modulus) G',
tangent of the loss angle (or loss factor) tan δ.

The master curves of G' and tan δ are therefore plotted as a function of frequency at different temperatures by using the frequency/temperature equivalence law.

These master curves are processed to reveal the glass transition zones. The damping at the glass transition point is then calculated.

In fact, it is at the glass transition point that damping is best.

The technique according to the invention provides a laminated window for vehicles comprising an intermediate film having good damping of noises transmitted by solids. This damping can also satisfy the criteria of insulation against aerodynamic noises and external noises. Thus the window according to the invention makes it possible to achieve good general soundproofing.

DETAILED DESCRIPTION OF THE FIGURES AND EXAMPLES

FIG. 1 is a partial cross-sectional view of the structure of a laminated window such as used for windshields and also increasingly for the side windows and rear windows. Of course, it is also possible to use the same structure for windshields and rear windows of automobiles, possibly with silicate-glass sheets of slightly different thicknesses.

The laminated window is made of two silicate glass sheets 1, 2 each 1.8 to 3 mm in thickness, two polyvinylbutyral layers 3, 4 each 0.38 mm in thickness, two thin PET films 5, 6, and one film 7 of viscoelastic acrylic polymer interposed between the PET films. The PET films 5, 6 respectively have a thickness of 0.05 mm. The film 7 consists of a film of Scotchdamp polymer of 0.05 mm thickness, of ISD 112 type, made by 3M. The different layers are juxtaposed in the manner that is standard for fabrication of laminated windows, and they are assembled at elevated temperature and under pressure.

The PET film 5 or the PET film 6 can be placed on one face of a system of layers that reflect infrared radiation. In addition to its noise-damping properties, such a window capable of reflecting infrared radiation ensures a greater thermally insulating effect with respect to incident thermal radiation. In addition, the laminated windows according to the invention have greater shattering resistance by virtue of the integration of PET films, and so automobile windows of very great comfort can be made in this way.

Figure 2:
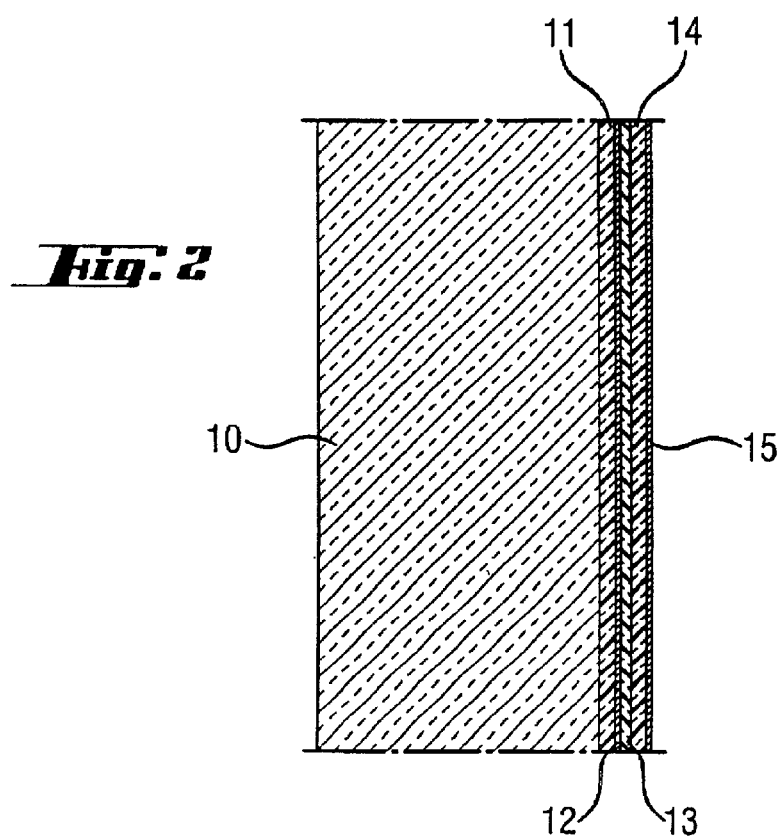
FIG. 2 shows a second embodiment of the laminated window according to the invention.

The laminated window shown in FIG. 2 comprises only one silicate-glass sheet 10. The silicate-glass sheet 10, with thickness of 4 mm, for example, is turned such that it faces toward the outside of the automobile when in installed condition. A PVB layer 11 of 0.76 mm thickness is joined to the silicate-glass sheet 10. The PVB layer 11 is followed by a PET film 12 of 0.05 mm thickness, a Scotchdamp polymer film 13 of ISD 112 type of 0.05 mm thickness, and a PET film 14 of 0.1 mm thickness, which is provided on its free surface with an abrasion-resistant layer 15. As in the case of the first described embodiment, the PET film 12 or the PET film 14 can also be provided if necessary with a layer that reflects infrared radiation, for example a multiple layer applied by a vacuum process and comprising a functional layer of silver.

Figure 3:
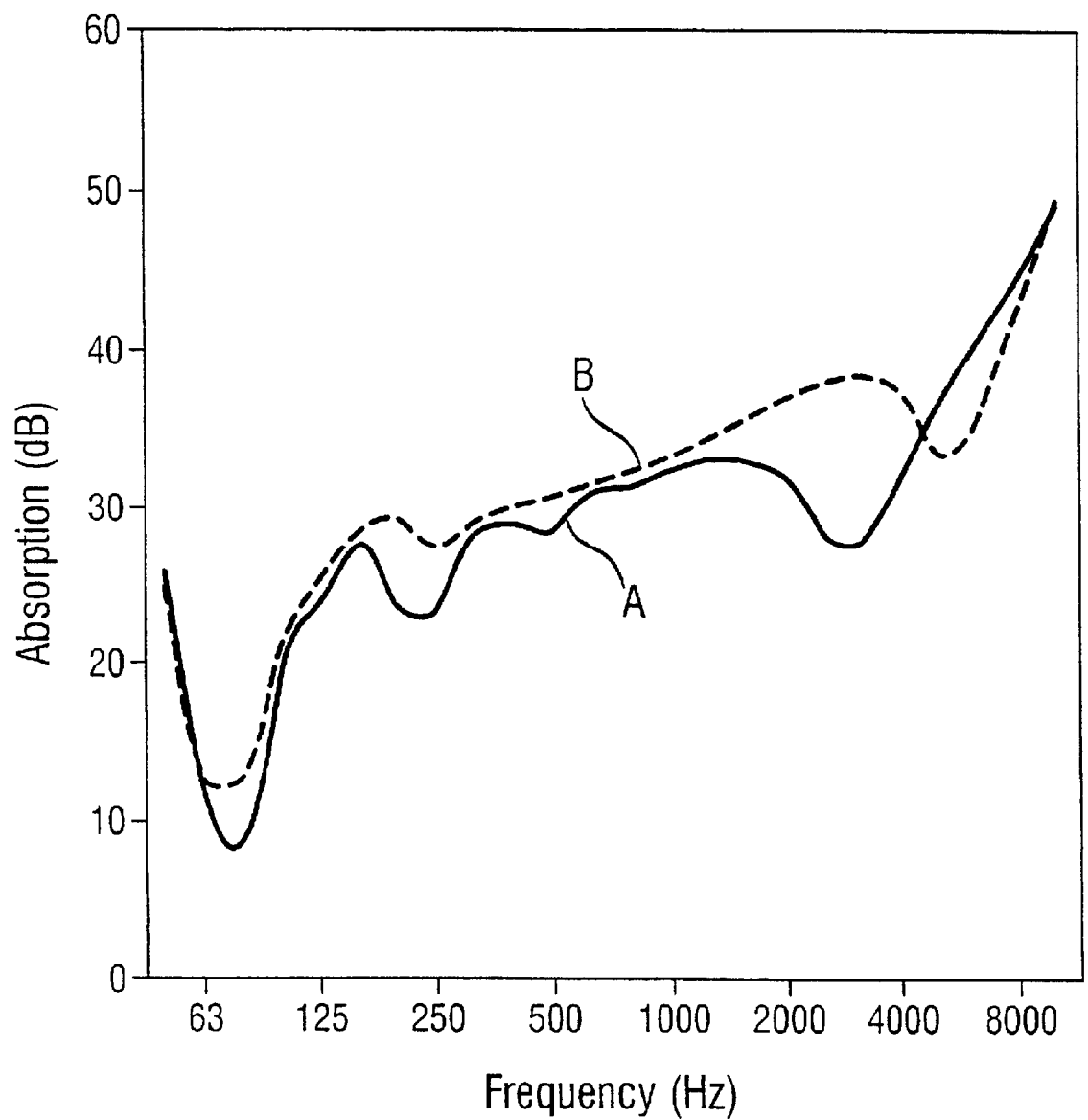
FIG. 3 shows the degree of damping as a function of the frequency of a standard laminated window and of the laminated window shown in FIG. 1.

The diagram shown in FIG. 3 demonstrates the improvement of noise damping achieved by the invention. In this diagram, the noise damping expressed in dB is plotted as a function of frequency, both for a laminated window of standard structure (curve A) and for a laminated window with the structure described with reference to FIG. 1 (curve B). The measurements are performed on flat laminated windows with dimensions of 80×50 mm at 20° C. The thickness of the silicate-glass sheets in both cases is 2.1 mm. The comparison model exhibiting the damping profile of curve A has the following structure: 2.1 mm of glass, 0.76 mm of PVB, 2.1 mm of glass, while the model according to the invention has the following structure: 2.1 mm of glass, 0.38 mm of PVB, 0.05 mm of PET, 0.05 mm of acrylic polymer, 0.05 mm of PET, 0.38 mm of PVB, 2.1 mm of glass.

The results show that the degree of damping of the window according to the invention is superior to the degree of damping of the comparison window in by far the greater part of the frequency spectrum. Nevertheless, it is especially in the region approximately between 200 and 300 Hz and in the coincidence frequency region at approximately 3000 Hz, where the damping curves of the windows exhibit the greatest valleys in the case of the standard laminated window, that the measured degrees of noise damping are clearly higher, and so, on the whole, a considerable improvement of noise damping is achieved.

French Patent Application 96 14 404 and German Patent Application 197 05 586.3 are incorporated herein by reference.

What is claimed as new and is desired to be secured by Letters Patent of the United States is:

1. A laminated window comprising a glass sheet and an intermediate film, wherein said film has a loss factor tan δ greater than 0.6 and a shear modulus G' smaller than $2 \times 10^7$ N/m$^2$ in a temperature range between 10 and 60° C. and in a frequency range between 50 and 10,000 Hz, wherein said intermediate film is associated with at least one film of normal acoustic performance.

2. A laminated window comprising a glass sheet and an intermediate film, wherein said film has a loss factor tan δ greater than 0.6 and a shear modulus G' smaller than $2 \times 10^7$ N/m$^2$ in a temperature range between 10 and 60° C. and in a frequency range between 50 and 10,000 Hz, further comprising a thermoplastic cement film, a polyester film interposed between the thermoplastic cement film and the intermediate film, and a polyester film juxtaposed on the other face of the intermediate film and provided on its free surface with an abrasion-resistant layer.

3. A laminated window comprising a glass sheet and an intermediate film, wherein said film has a loss factor tan δ greater than 0.6 and a shear modulus G' smaller than $2 \times 10^7$ N/m$^2$ in a temperature range between 10 and 60° C. and in a frequency range between 50 and 10,000 Hz, wherein the intermediate film comprises viscoelastic polymer made of acrylic polymer without plasticizer having a shear modulus G' between $10^{4.5}$ Pa at 60° C. and $10^{6.5}$ Pa at 0° C. as well as a loss factor tan δ between approximately 0.8 and 1 in a temperature range of 0 to 60° C.

4. A film designed to be used as an intermediate layer in a soundproofing laminated window, said film having a loss factor tan δ greater than 0.6 and a shear modulus G' smaller than $2 \times 10^7$ N/m$^2$ in a temperature range between 10 and 60° C. and in a frequency range between 50 and 10,000 Hz.

5. The film of claim 4, wherein said film is associated with at least one film of normal acoustic performance.

6. The film of claim 5, wherein said film is a thermoplastic acrylic polymer film 0.05 to 1.0 mm thick, and wherein said film is joined to at least one glass sheet with interposition of a polyester film 0.01 to 0.1 mm thick and a thermoplastic cement film 0.3 to 0.8 mm thick.

7. The film of claim 6, wherein the thermoplastic film comprises viscoelastic polymer made of acrylic polymer without plasticizer having a shear modulus G' between $10^{4.5}$ Pa at 60° C. and $10^{6.5}$ Pa at 0 ° C., as well as a loss factor tan δ between approximately 0.8 and 1 in a temperature range of 0 to 60° C.

8. The film of claim 4, wherein said film comprises plasticizers and polyvinylacetal resins.

9. A film useful as an intermediate layer in a soundproofing laminated window, said film having a loss factor tan δ greater than 0.6 and a shear modulus G' smaller than $2 \times 10^7$ N/m$^2$ at a temperature of 20° C. and at a frequency of 50 Hz.

10. The film of claim 9, wherein said film is associated with at least one film of normal acoustic performance.

11. The film of claim 10, wherein said film is a thermoplastic acrylic polymer film 0.05 to 1.0 mm thick, and wherein said film is joined to at least one glass sheet with interposition of a polyester film 0.01 to 0.1 mm thick and a thermoplastic cement film 0.3 to 0.8 mm thick.

12. A laminated window comprising a glass sheet and the film of claim 9.

13. A laminated window comprising a glass sheet and the film of claim 10.

14. A laminated window comprising a glass sheet and the film of claim 11.

15. A laminated window comprising a glass sheet and the film of claim 9, wherein said film comprises plasticizers and polyvinylacetal resins.

* * * * *

UNITED STATES PATENT AND TRADEMARK OFFICE
CERTIFICATE OF CORRECTION

PATENT NO. : 6,821,629 B2
DATED : November 23, 2004
INVENTOR(S) : Garnier et al.

It is certified that error appears in the above-identified patent and that said Letters Patent is hereby corrected as shown below:

<u>Title page,</u>
Items [45], and [*] Notice, information should read as follows:

-- [45] Date of Patent: **\*Nov. 23, 2004**

[*] Notice: Subject to any disclaimer, the term of this patent is extended or adjusted under 35 U.S.C. 154(b) by 0 days.

This Patent is subject to a termainal discalimer. --

Signed and Sealed this

Eighth Day of March, 2005

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,821,629 B2 | Page 1 of 1 |
| APPLICATION NO. | : 10/028215 | |
| DATED | : November 23, 2004 | |
| INVENTOR(S) | : Garnier et al. | |

It is certified that error appears in the above-identified patent and that said Letters Patent is hereby corrected as shown below:

Title page,
Item [45] and [*], Notice, should read as follows:
-- [45] **Date of Patent: *Nov. 23, 2004**

[*] Notice: Subject to any disclaimer, the term of this patent is extended or adjusted under 35 U.S.C. 154(b) by 0 days.

This Patent is subject to a terminal disclaimer. --.

Signed and Sealed this

Fourth Day of July, 2006

JON W. DUDAS
*Director of the United States Patent and Trademark Office*